United States Patent [19]

Maroschak

[11] 3,789,615
[45] Feb. 5, 1974

[54] LIGHTWEIGHT HIGH COMPRESSIVE STRENGTH DRAINAGE PIPE

[75] Inventor: Ernest J. Maroschak, Roseboro, N.C.

[73] Assignee: Plastic Tubing, Inc., Roseboro, N.C.

[22] Filed: June 12, 1972

[21] Appl. No.: 261,781

Related U.S. Application Data

[63] Continuation-in-part of Ser. No. 228,508, Feb. 23, 1972.

[52] U.S. Cl............... 61/11, 138/121, 138/178
[51] Int. Cl............... E02b 11/00, F16l 11/12
[58] Field of Search...... 61/10, 11, 12, 13; 130/178, 130/121, 105, 173

[56] References Cited
UNITED STATES PATENTS

| 3,658,097 | 4/1972 | Martin et al. | 138/121 |
| 3,605,817 | 9/1971 | Bauman et al. | 138/121 |
| 1,875,395 | 9/1932 | Salisbury | 61/10 |

OTHER PUBLICATIONS
Hancor Sweets File 15,21 Han 1970

Primary Examiner—Jacob Shapiro
Attorney, Agent, or Firm—Parrott, Bell, Seltzer, Park & Gibson

[57] ABSTRACT

A corrugated plastic drainage pipe having a compressive strength of at least 1,000 pounds per linear foot and being of lightweight construction with a wall thickness no greater than about one-sixteenth inch and wherein spaced apart successively arranged annular ribs with interconnecting annular valley portions therebetween define corrugations along the periphery of the pipe, the ribs and valley portions per foot each being about seventeen in number, the majority of the annular ribs being uninterrupted and arranged in spaced groups with an interrupted rib between adjacent groups, and each interrupted rib comprising a set of three interconnected circularly arranged spaced apart arcuate rib segments correspondingly arranged throughout the pipe, and one of the rib segments of each set being substantially longer than the other two rib segments and having an arcuate extent of at least 180 degrees.

14 Claims, 5 Drawing Figures

LIGHTWEIGHT HIGH COMPRESSIVE STRENGTH DRAINAGE PIPE

This application is a continuation-in-part of my co-pending application Ser. No. 228,508, filed Feb. 23, 1972 and entitled CORRUGATED DRAINAGE PIPE.

This invention relates to corrugated drainage pipes and, more particularly, to drainage pipes that are buried in the ground for use with septic tanks, for example, and wherein the pipe is of lightweight construction with a wall thickness no greater than about one-sixteenth inch and has a compressive strength of at least 1,000 pounds per linear foot to withstand compressive forces of heavy vehicles, for example, passing thereover.

The primary object of this invention is to provide an improved corrugated resilient plastic drainage pipe of lightweight construction wherein the pipe is provided with annular ribs and interconnecting valley portions arranged and so constructed to provide a high compressive strength to the pipe and wherein the wall thickness of the pipe is very thin so as to minimize the plastic material in the pipe and to obtain the lightweight construction.

A more specific object of this invention is to provide an improved corrugated resilient plastic drainage pipe having a compressive strength of at least 1,000 pounds per linear foot, with the pipe being of lightweight construction with a wall thickness no greater than about one-sixteenth inch and formed of a plastic material having a density within the range of about 0.954 to 0.957 gm/cm$^3$ so as to provide the desired resiliency to the pipe while attaining the desired level of compressive strength therein and wherein the pipe has spaced apart successively arranged annular ribs with interconnecting annular valley portions therebetween defining corrugations along the periphery of the pipe, and wherein the ribs and valley portions per foot are each about 17 in number, the majority of the annular ribs being uninterrupted and successively arranged in spaced groups with an interrupted rib between adjacent groups, and wherein each interrupted rib comprises a set of three interconnected circularly arranged spaced apart arcuate rib segments correspondingly arranged throughout the pipe, and one rib segment of each set being substantially longer than the other two rib segments and having an arcuate extent of at least 180°.

Some of the objects and advantages of the invention having been stated, others will appear as the description proceeds, when taken in connection with the accompanying drawing, in which FIG. 1 is an elevational view of a length of corrugated drainage pipe in accordance with this invention, viewed from the bottom of the pipe;

Figure 1:
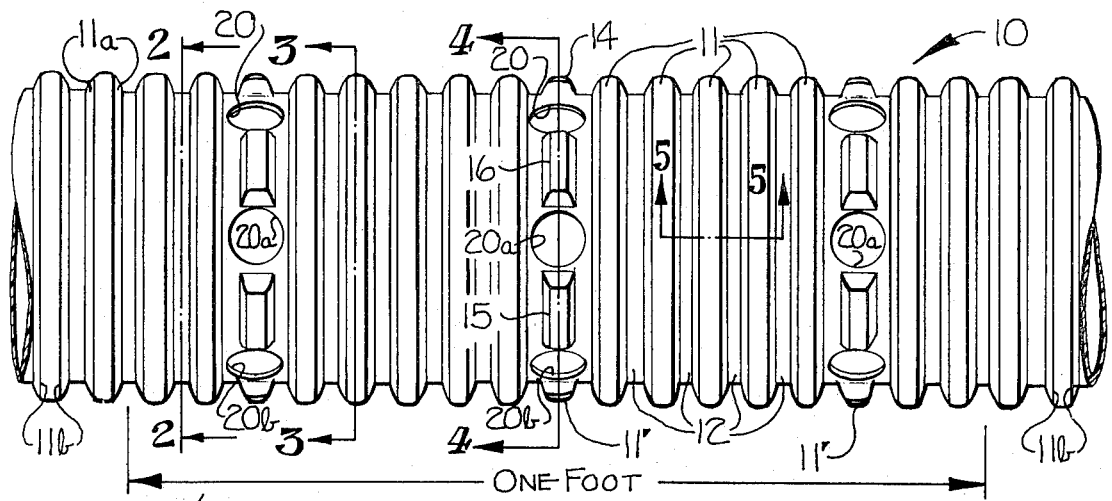

Referring now more particularly to the drawing, reference numeral 10 broadly indicates a corrugated drainage pipe in accordance with this invention which is formed of a plastic material, such as polyethylene, and wherein the wall thickness of the drainage pipe is no greater than about one-sixteenth inch.

Spaced apart annular ribs 11 are successively arranged in a uniform manner throughout the length of the pipe and are interconnected by annular valley portions 12 positioned therebetween. As will be noted upon viewing FIG. 1, wherein one linear foot of the pipe is identified therein, the number of ribs and valley portions per linear foot are each about seventeen in number, with the majority of the annular ribs being uninterrupted and successively arranged in spaced groups of five with an interrupted rib 11' between adjacent groups.

Viewing the drainage pipe in terms of its repeat pattern, it will be noted that the ribs and valley portions are each approximately six in number per each 4 inches of pipe length, with five of the six annular ribs 11 being uninterrupted and successively arranged in a group and wherein the uninterrupted rib 11' is adjacent one end of the group.

Referring now to the interrupted ribs, it will be noted that each interrupted rib 11' comprises a set of three circularly arranged spaced apart arcuate rib segments, as indicated by numerals 14, 15 and 16, respectively, with the respective rib segments forming each of the interrupted ribs 11' being correspondingly arranged throughout the pipe so as to be in longitudinal alignment with each other.

Between the ends of arcuate rib segments 14, 15, 16 is a series of three drainage holes identified at 20, 20a and 20b, which series of holes, as illustrated, is arcuately arranged. The series of drainage holes 20, 20a and 20b are located around the bottom half of the pipe, when the pipe is properly installed in the ground, so that the rib segments 14, 15, 16 projecting outwardly therefrom serve to space the holes from the earth for effecting proper drainage therethrough. Furthermore, it will be noted that the rib segment 14 is desirably longer than the other two segments and has an arcuate extent encompassing at least the upper half of the drainage pipe, i.e., at least 180°, and preferably is of an extent of at least 200° to 220° so as to shieldingly protect drainage holes 20 and 20b during the backfilling of the earth around the drainage pipe to avoid blocking the holes.

For aiding in properly installing the drainage pipe, sight means 30 (FIG. 4) is preferably provided longitudinally of the pipe along the surface thereof in direct opposition to drainage hole 20a for visually aiding in installing the pipe in the ground with the drainage holes properly positioned lowermost. As illustrated, sight means 30 is in the form of a painted line contrasting with the color of the drainage pipe but may, if desired, be in the form of a series of small rib portions extending longitudinally of the pipe along the outer surface of the annular ribs 11.

Figures 2, 3, 4:
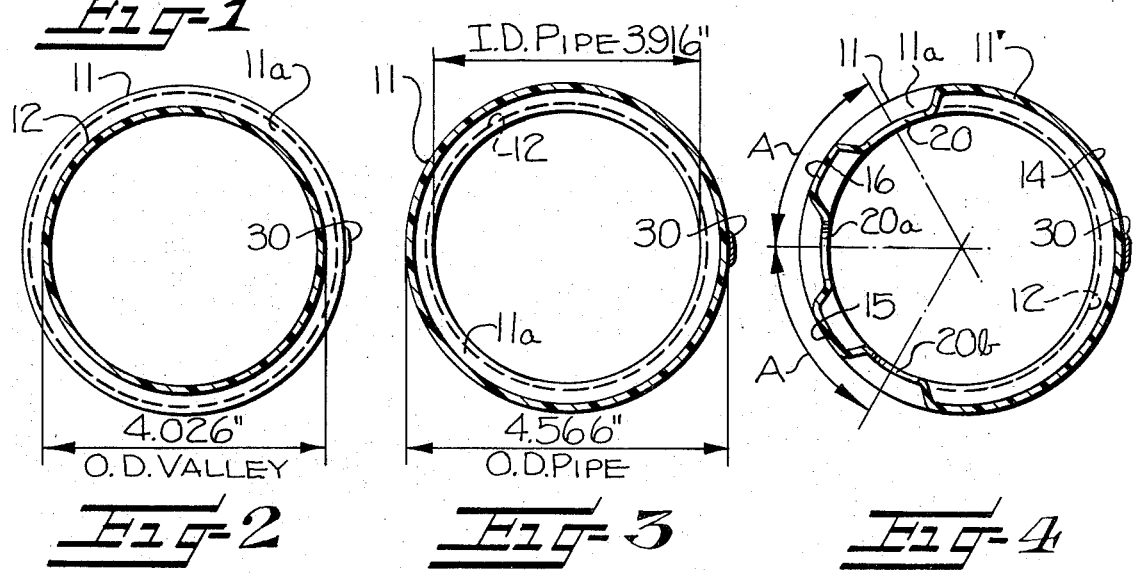
FIG. 2 is a cross sectional view of the drainage pipe taken along line 2—2 of FIG. 1.
FIG. 3 is a cross sectional view of the drainage pipe taken along line 3—3 of FIG. 1.
FIG. 4 is a cross sectional view of the drainage pipe taken along line 4—4 of FIG. 1.

Referring now more particularly to the set of arcuate rib segments 14, 15, 16, which comprise each of the interrupted ribs 11', as noted earlier, rib segment 14 is desirably of an arcuate extent exceeding 180°, for shieldingly protecting the drainage holes. The shorter rib segments 15 and 16 are preferably of the same length as each other and each, as illustrated, has an arcuate extent of about 40° to 45°. Preferably, as illustrated, the respective arcuate segments 14, 15, 16 are uniformly spaced from each other so as to readily accommodate similar size drainage holes therebetween, which drainage holes are of at least ½ inch diameter and preferably of about ¾ inch diameter. The drainage holes each extend through an arcuate extent of the pipe of about 15° to 25° and have a diameter greater than the width of the ribs. As illustrated in FIG. 4, intersecting axes of adjacent drainage holes define an included angle of about 60° as indicated at A.

Referring now more particularly to the detail construction and arrangement of the ribs 11 and interconnecting valley portions 12, it will be noted that the drawing illustrates a nominal 4 inch corrugated drainage pipe made in accordance with this invention. However, it is to be understood that the constructional features of the invention may be embodied in a variety of pipe sizes such as nominal 5 and 6 inch diameter pipes with the only appreciable difference being in the overall weight per unit of length. The 4 inch pipe, as illustrated in FIG. 3, has an internal diameter of 3.916 inches measured interiorly of the valleys 12, and an external diameter of 4.566 inches. This 4 inch diameter pipe embodiment of the invention has a weight of no more than about 6 ounces per linear foot and preferably approximately 5-½ ounces per linear foot as presently being commercialized. As indicated earlier, the compressive strength of the pipe is at least 1,000 pounds per linear foot and tests have indicated that the compressive strength falls within a range of about 1,000 to 1,100 pounds per linear foot even after the drainage holes have been drilled therein. In this respect, it has been determined that about 3 percent of the weight of the pipe is lost through the drilling of the nine holes per foot therein and that the three percent loss in weight is almost directly correlated to a three percent reduction in the compressive strength of the product following drilling. Thus, the corrugated drainage pipe may be viewed as having a 3 percent higher compressive strength when tested prior to the holes being drilled therein but, the compressive strength is always at least 1,000 pounds per linear foot, even after the holes are provided.

At this point, it is believed to be helpful to briefly outline the type of standard test that is employed in determining the compressive strength of the drainage pipe. The test equipment involves positioning a 1-foot length of the pipe between a movable 1-foot long pressure plate and a back-up plate with 2 inches of sand surrounding the pipe. When 1,000 pounds of pressure is applied to the pressure plate, a lateral compressive force is applied to the pipe, and in the event the diameter of the pipe is reduced no more than 1 inch by the compressive force, the pipe has passed the test. It is understood that this type of test is a standard test for pipe having a diameter of 4 to 6 inches.

It has been determined from compressive tests that, if the density of the polyethylene plastic material falls below the range of about 0.954 to 0.957 gm/cm³, the pipe would undesirably be too flexible and springy and normally would not pass the compressive strength test of 1,000 pounds per linear foot. Also, it has been determined by similar tests that, if the density goes above said range of b 0.954 to 0.957 gm/cm³, the pipe will be too stiff and brittle and would be most difficult to handle and would readily crack in cold weather, particularly when being uncoiled from a coiled package.

Figure 5:
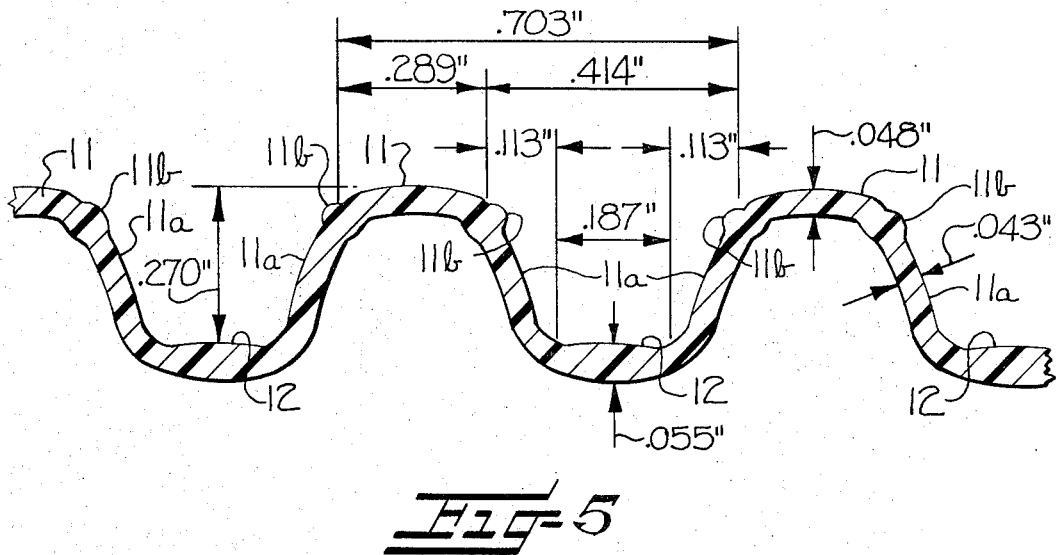
FIG. 5 is an enlarged fragmentary sectional view taken along line 5—5 of FIG. 1 and illustrating the wall configuration of the drainage pipe.

Referring more particularly to the details of the configuration of the ribs and valleys, and wall thicknesses thereof, it is to be noted, as best illustrated in FIG. 5, that the ribs 11 are wider than the valley portions 12 interconnecting the same and also that the height of the ribs is greater than the width of the valley portions. This arrangement considered with the earlier mentioned number of ribs and valley portions per unit of length of pipe contributes to the high compressive strength of the pipe even though, as earlier noted, the wall thickness is no greater than about one-sixteenth inch. For a more specific comparison, it is to be noted that all the ribs have a width of approximately one-half inch, the width being determined by adding the width of the periphery of the ribs plus the width of the said walls thereof taken in a straight line, namely, as illustrated in FIG. 5, adding $0.289 + (2 \times 0.113) = 0.515$. As illustrated, the height of the ribs when measured from the annular valleys 12 is 0.270 inch. The width of the annular valleys 12 taken to the juncture with the side walls 11a of the ribs is 0.187 inch, as illustrated.

It will further be noted, as best illustrated in FIG. 5, that small annular reinforcing beads 11b are provided along opposite sides of each of the said annular ribs closely adjacent the periphery thereof. It has been determined that these annular beads enhance the compressive strength of the pipe by providing thickened rib wall portions serving somewhat analogous to reinforcing rings. It will further be noted that the thickest wall portion of the pipe is through the medial portions of the valleys 12 with the thickness thereof being 0.055 inch. Further, it will be noted that the thinnest wall portion is defined by the side walls 11a of the ribs 11, which are 0.043 inches. Further, it will be noted that an intermediate wall thickness of 0.048 inches is present in the outer wall portions of the ribs 11. It is also noted that the interior surfaces of said annular valley portions 12 are crowned or curved to further contribute to the desired compressive strength characteristics of the product. Also, the peripheries of the ribs 11, for similar reasons, are crowned.

Thus, it will be noted that this thus described and illustrated 4 inch diameter pipe embodiment of the invention has a wall thickness no greater than about one-sixteenth inch and preferably within the range of about 0.043 to 0.055 inches, as presently being commercialized, and wherein the same is desirably formed of polyethylene plastic material.

It should thus be apparent from the foregoing that the instant invention permits obtaining a high compressive strength corrugated plastic drainage pipe with a small quantity of plastic material due to the manner in which the pipe is constructed.

In the drawing and specification, there has been set forth a preferred embodiment of the invention, and although specific terms are employed, they are used in a generic and descriptive sense only and not for purposes of limitation.

What is claimed is:

1. A corrugated resilient plastic drainage pipe having a compressive strength of at least 1,000 pounds per linear foot and being of lightweight construction with a wall thickness no greater than about one-sixteenth inch and weighing no more than about 6 ounces per linear foot, said pipe having spaced apart successively arranged annular ribs with interconnecting annular valley portions therebetween defining corrugations along the periphery of the pipe and wherein the interior surfaces of said annular valley portions are crowned and the wall thickness of the medial areas of said annular valley portions is greater than any other wall portion of the corrugations of the pipe, and wherein the ribs and valley portions per foot are each about 17 in number, the majority of said annular ribs being uninterrupted and successively arranged in spaced groups with an interrupted rib between adjacent groups, each interrupted rib comprising a set of three interconnected circularly arranged spaced apart arcuate rib segments correspondingly arranged throughout the pipe, and one rib segment of each set being substantially longer than the other two rib segments and having an arcuate extent of at least 180°, the other two rib segments being of substantially equal length.

2. A corrugated resilient plastic drainage pipe according to claim 1, wherein said ribs are wider than said valley portions interconnecting the same and wherein the height of said ribs is also greater than the width of the valley portions.

3. A corrugated resilient plastic drainage pipe according to claim 1, wherein the wall thickness of the medial areas of said annular valley portions is of about 0.055 inch.

4. A corrugated resilient plastic drainage pipe according to claim 1, wherein relatively small annular reinforcing beads are provided along opposite sides of each of said annular ribs closely adjacent the periphery thereof.

5. A corrugated resilient plastic drainage pipe according to claim 1, wherein the interior diameter of the pipe is approximately 4 inches and the exterior diameter is approximately 4½ inches and wherein the peripheries of the annular ribs are crowned.

6. A corrugated resilient plastic drainage pipe according to claim 1, wherein a series of three drainage holes are provided between said rib segments of each set with the diameter of the holes being greater than the width of the ribs, two of said drainage holes being positioned between the opposite terminal ends of said long rib segment and the respective shorter rib segments, the third drainage hole being positioned between the shorter rib segments and being substantially centrally disposed between said two holes, and means extending longitudinally of said pipe along the outer surface thereof directly opposite said third drainage holes for visually aiding in installing the pipe in the ground with all of the drainage holes located below the horizontal centerline of the pipe and the third drainage holes occupying lowermost position.

7. A corrugated resilient plastic drainage pipe having a compressive strength of at least 1,000 pounds per linear foot and being of lightweight construction of a plastic material having a density within the range of about 0.954 to 0.957 gm/cm³ with a wall thickness no greater than about one-sixteenth inch, said pipe having spaced apart successively arranged annular ribs with interconnecting annular valley portions therebetween defining corrugations along the periphery of the pipe and wherein the interior surfaces of said annular valley portions are crowned and the wall thickness of the medial areas of said annular valley portions is greater than any other wall portion of the corrugations of the pipe, and wherein the ribs and valley portions per foot are each about 17 in number, the majority of said annular ribs being uninterrupted and successively arranged in spaced groups of five with an interrupted rib between adjacent groups, each interrupted rib comprising a set of three interconnected circularly arranged spaced apart arcuate rib segments correspondingly arranged throughout the pipe, and one rib segment of each set being substantially longer than the other two rib segments and having an arcuate extent of at least 180°, the other two rib segments being of substantially equal length.

8. A corrugated resilient plastic drainage pipe according to claim 7, wherein the interior diameter of the pipe is approximately 4 inches and the exterior diameter of the pipe is approximately 4½ inches, and wherein the pipe weighs no more than about 6 ounces per linear foot.

9. A corrugated resilient plastic drainage pipe according to claim 7, wherein the wall thickness of the pipe is within the range of about 0.043 to 0.055 inch and the plastic material is polyethylene.

10. A corrugated resilient plastic drainage pipe according to claim 7, wherein the pipe weighs no more than 5½ ounces per linear foot and wherein the plastic material is polyethylene having a density of 0.955 gm/cm³.

11. A corrugated resilient plastic drainage pipe according to claim 7, wherein said ribs are wider than said valley portions interconnecting the same and wherein the height of said ribs is also greater than the width of the valley portions.

12. A corrugated resilient plastic drainage pipe according to claim 7, wherein a series of three drainage holes are provided between said rib segments of each set with the diameter of the holes being greater than the width of the ribs, two of said drainage holes being positioned between the opposite terminal ends of said long rib segment and the respective shorter rib segments, and the third drainage hole being positioned between the shorter rib segments and being substantially centrally disposed between said two holes.

13. A corrugated resilient plastic drainage pipe having a compressive strength of at least 1,000 pounds per linear foot and being of lightweight construction of a plastic material having a density within the range of about 0.954 to 0.957 gm/cm³ with a wall thickness no greater than about one-sixteenth inch, said pipe having spaced apart successively arranged annular ribs with interconnecting annular valley portions therebetween defining corrugations along the periphery of the pipe and wherein the interior surfaces of said annular valley portions are crowned and the wall thickness of the medial areas of said annular valley portions is greater than any other wall portion of the corrugations of the pipe, and wherein the ribs and valley portions are approximately six in number per each 4 inches of pipe length, five of said six annular ribs being successively arranged in a group with an interrupted rib adjacent one end of the group, each interrupted rib comprising a set of three interconnected circularly arranged spaced apart arcuate rib segments correspondingly arranged throughout the pipe, and one rib segment of each set being substantially longer than the other two rib segments and having an arcuate extent of at least 180°, the other two rib segments being of substantially equal length.

14. A corrugated resilient plastic drainage pipe having a compressive strength of at least 1,000 pounds per linear foot and being of lightweight construction with a wall thickness no greater than about one-sixteenth inch and weighing no more than about 6 ounces per linear foot, said pipe having spaced apart successively arranged annular ribs with interconnecting annular valley portions therebetween defining corrugations along the periphery of the pipe and wherein the interior surfaces of said annular valley portions are crowned and the wall thickness of the medial areas of said annular valley portions is greater than any other wall portion of the corrugations of the pipe, and wherein the ribs and valley portions per foot are each about 17 in number, some of said ribs being interrupted and comprising a set of three interconnected circularly arranged spaced apart arcuate rib segments correspondingly arranged throughout the pipe, and one rib segment of each set being substantially longer than the other two rib segments and having an arcuate extent of at least 180°, the other two rib segments being of substantially equal length.

* * * * *